United States Patent [19]

Pechacek

[11] Patent Number: 5,290,072
[45] Date of Patent: Mar. 1, 1994

[54] QUICK-ACTING PIPE CONNECTOR ASSEMBLY

[76] Inventor: Raymond E. Pechacek, 1846 Latexo, Houston, Tex. 77018

[21] Appl. No.: 972,797

[22] Filed: Nov. 6, 1992

Related U.S. Application Data

[63] Continuation-in-part of Ser. No. 788,824, Nov. 7, 1991, Pat. No. 5,221,019.

[51] Int. Cl.⁵ .................. F16L 17/10; F16L 23/02
[52] U.S. Cl. .................................. 285/97; 285/365; 285/368; 285/106
[58] Field of Search ................. 285/96, 97, 106, 365, 285/368

[56] References Cited

U.S. PATENT DOCUMENTS

| | | | |
|---|---|---|---|
| 871,421 | 11/1907 | Koppers . | |
| 976,931 | 11/1910 | Schniewind . | |
| 2,330,220 | 9/1943 | Kemper | 220/46 |
| 2,551,750 | 5/1951 | Liskey, Jr. | 114/201 |
| 2,662,053 | 12/1953 | Brown | 202/243 |
| 2,691,460 | 10/1954 | Barnebey | 220/46 |
| 3,136,007 | 6/1964 | Maher et al. | 20/16 |
| 3,224,382 | 12/1965 | Floehr | 105/282 |
| 3,285,308 | 11/1966 | Stambaugh | 150/8 |
| 3,379,623 | 4/1968 | Forsyth | 202/252 |
| 3,500,584 | 3/1970 | Clery et al. | 49/209 |
| 3,632,303 | 1/1972 | Aigner | 21/93 |
| 3,819,479 | 6/1974 | Jacquelin | 176/87 |
| 3,886,047 | 5/1975 | Billups, Jr. | 195/139 |
| 3,951,300 | 4/1976 | Kalasek | 220/327 |
| 4,033,828 | 7/1977 | Morrow et al. | 202/248 |
| 4,054,411 | 10/1977 | Beck | 432/242 |
| 4,114,901 | 9/1978 | Pot | 277/34.3 |
| 4,126,520 | 11/1978 | Horster | 202/248 |
| 4,129,307 | 12/1978 | Nishiura et al. | 277/34.3 |
| 4,152,216 | 5/1979 | Nishiura et al. | 202/248 |
| 4,222,590 | 9/1980 | Regan | 285/97 |
| 4,427,378 | 1/1984 | Bowers | 432/242 |
| 4,596,197 | 6/1986 | Kinzler | 110/173 |
| 4,640,348 | 2/1987 | Roberts | 285/368 |
| 4,820,384 | 4/1989 | Pechacek | 202/245 |
| 4,848,806 | 7/1989 | Miller | 285/106 |
| 5,048,876 | 9/1991 | Wallskog | 285/364 |
| 5,098,132 | 3/1992 | Burton | 285/96 |
| 5,221,019 | 6/1993 | Pechacek et al. | 220/315 |

OTHER PUBLICATIONS

Victaulic Company of America, Metal Seal Victaulic brochure dated Nov. 1985.
Raymond E. Pechacek, Sketch SK 30120/26, dated Dec. 2, 1991.
Hahn & Clay drawing No. 1533-C-3, last revised Jun. 11, 1990, entitled "F.A.C.T. Closure Assembly/General" with penciled sketches.
One (1) sheet of description entitled "Safety Lock For Quick Opening Closure".

*Primary Examiner*—Eric K. Nicholson
*Attorney, Agent, or Firm*—Pravel, Hewitt, Kimball & Krieger

[57] ABSTRACT

A quick-acting pipe connector assembly used to join two pipes. The assembly includes a flange connected to the first pipe. The flange has an end face and a plurality of openings around the periphery of the end face. An end fitting is connected to the second pipe. The end fitting has an end face sized to fit against the flange end face. A force ring is attached to the end fitting and has a plurality of openings around its periphery. A plurality of connector bolts are attached to and extend through force ring openings. Each of the connector bolts extend through one of the flange openings. A lock ring is rotatably attached to the flange. The flange is positioned between the lock ring and the force ring. The lock ring rotates relative to the connector bolts to lock the connector bolts to the flange. A force actuator is disposed in the force ring. The force actuator expands under fluid pressure to react against the force ring and places the locked connector bolts in a prestressed condition and seals the end fitting against the flange. A ramp ring assembly is rotatably supported by the force ring. The ramp ring is rotated to lock the end fitting against the flange.

13 Claims, 9 Drawing Sheets

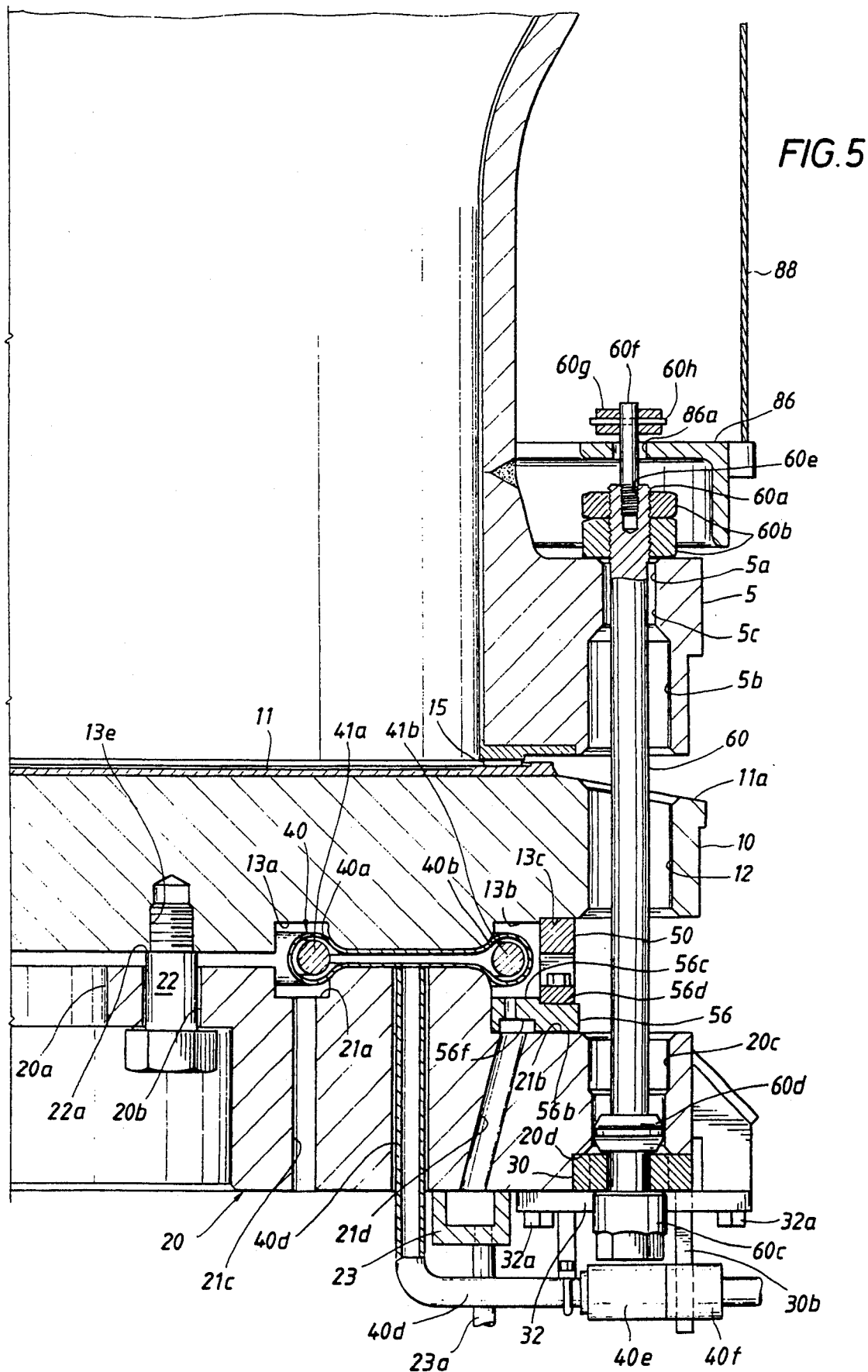

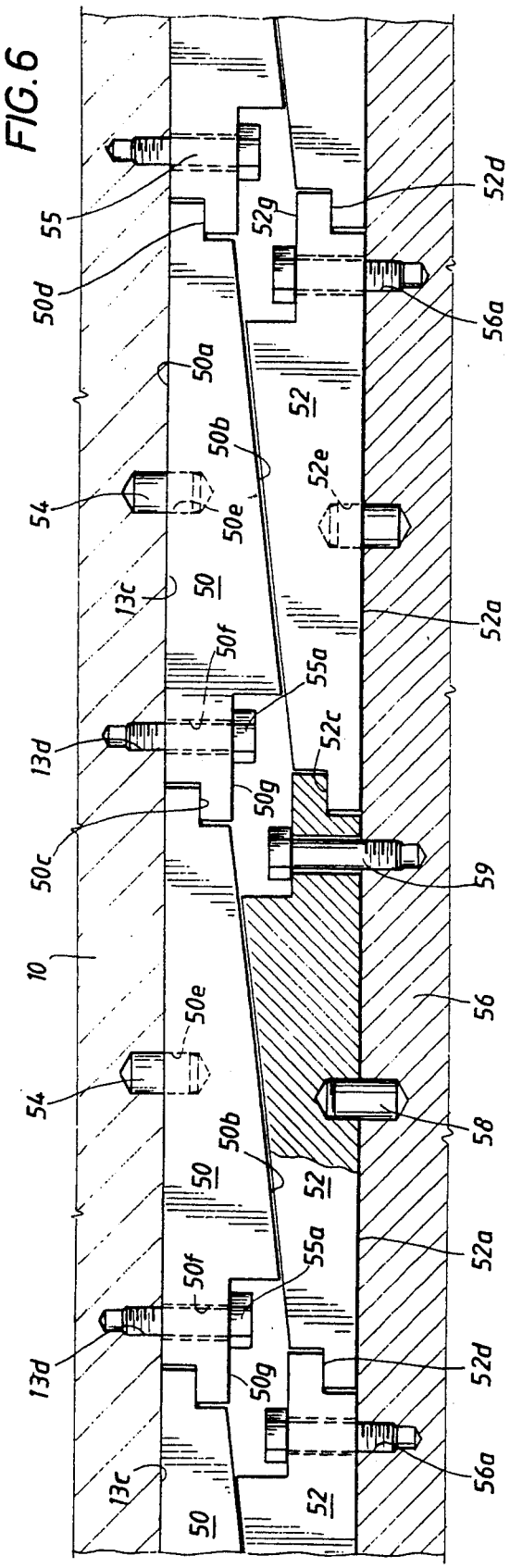
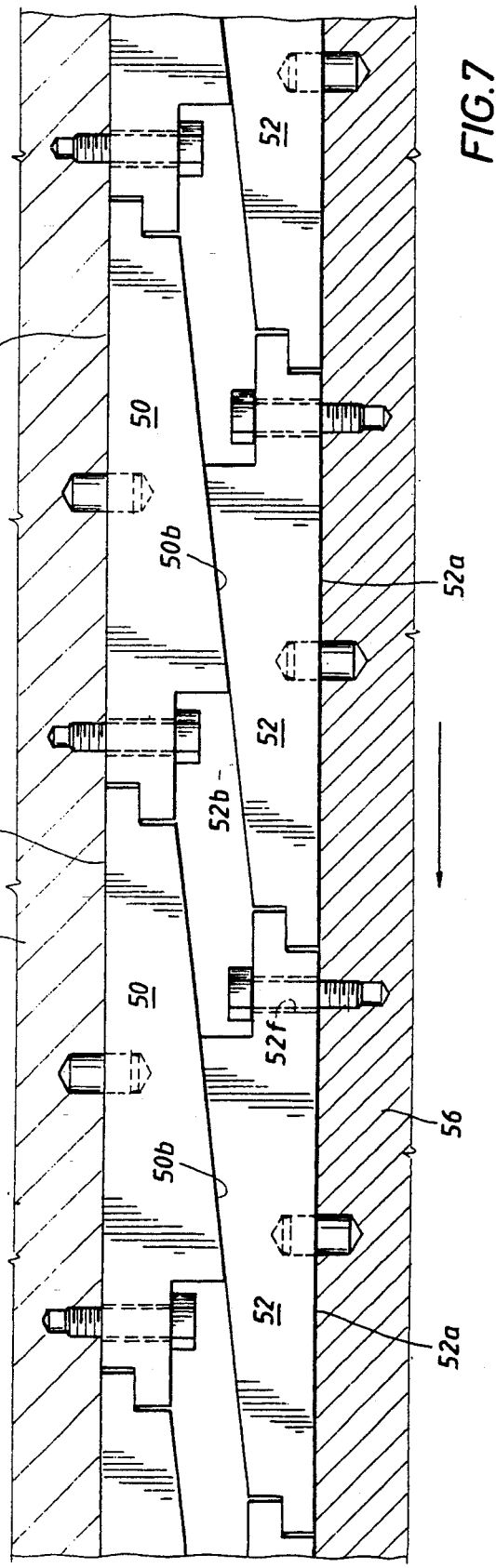

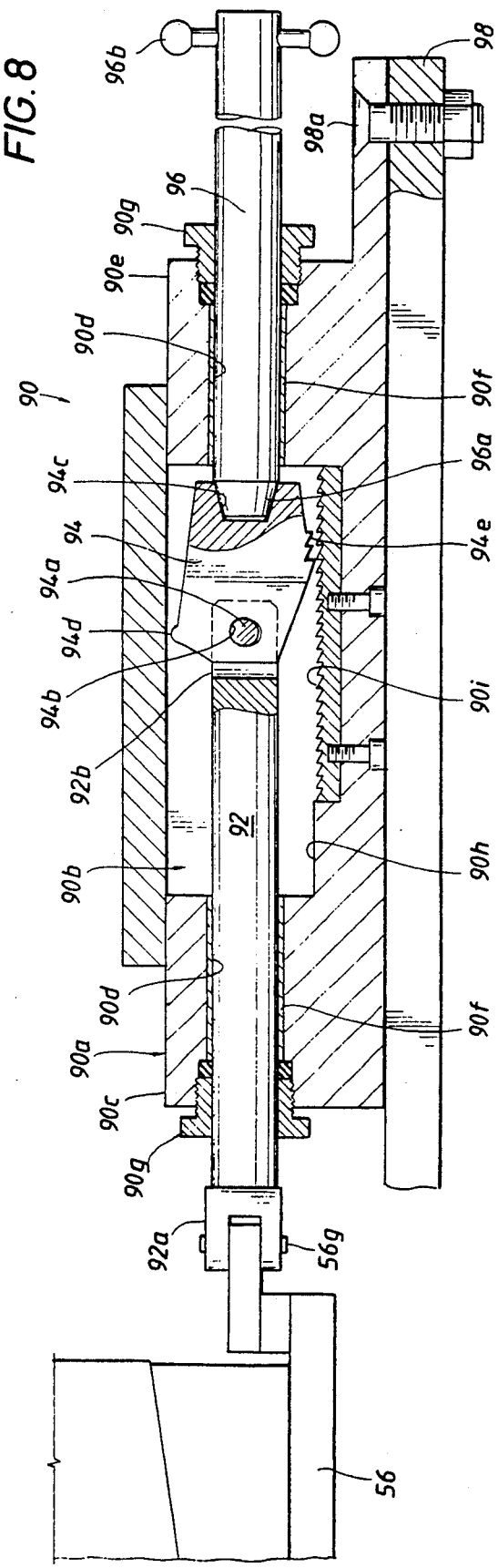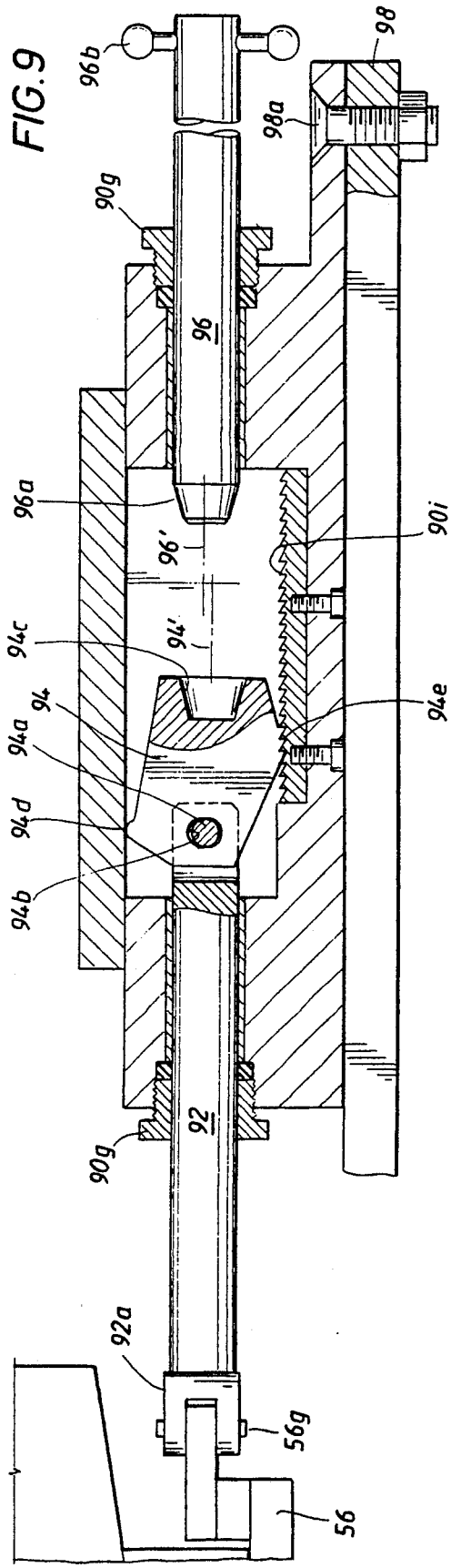

QUICK-ACTING PIPE CONNECTOR ASSEMBLY

This Application is a continuation-in-part of U.S. application Ser. No. 788,824, filed Nov. 7, 1991 for a REMOTELY OPERABLE VESSEL COVER POSITIONER now U.S. Pat. No. 5,221,019 inventor listed in the present application was a named inventor in application Ser. No. 788,824.

BACKGROUND OF THE INVENTION

1. Field of the Invention

The present invention relates to the flange closure of large vessels which may operate under pressure and at high temperature and to the flanged connection of pipes.

2. Description of the Prior Art

The most common method for mounting doors, covers, or other closure devices on large vessels which operate under pressure and at high temperature has been by bolting them to flanges on the vessel opening. Similarly, the most common method for joining two pipes is to mount flanges to the ends of the pipes and then bolt the flanges together. Sealing, where required, is usually by use of various gaskets or O-rings. High temperature or pressure vessel closures and flanged connections are typically held in place by numerous bolts or studs and nuts. Removal and replacement of the bolted cover or flange is a time-consuming operation. Removal of the bolts or nuts must generally be done by operators on site and thus it is sometimes necessary to wait for the vessel to cool before the closure can be removed.

Another method sometimes used to remove such a vessel cover involves the placement of some type of strong back or frame over the back of the closure and attaching the frame to the vessel, thereby pressing the closure itself onto the opening. Such frames can be hinged or otherwise attached to reduce the number of bolts or other attachment devices necessary to hold the closure on the vessel opening. This method requires the sacrifice of some of the rigidity and sealing ability found in the aforementioned bolted flange system. Numerous cycles of operation can cause the cover itself to become warped or cause the sealing devices used to deteriorate so that a successful design must allow for these increased tolerances. Where the temperatures and pressures encountered will allow their use, inflatable seals are sometimes incorporated into either of these types of vessel closure designs in order to accommodate the warping and deterioration that will take place.

A device disclosed in U.S. Pat. No. 3,819,479 exhibits inflatable seals which can aid in sealing between the vessel flange and the closure plug and the flange of the plug. Some of these seals can also be inflated in order to lift the plug itself and allow its movement. This design incorporates a variation of the bolted flange with the plug assembly being bolted in place by use of a collar.

The device disclosed in U.S. Pat. No. 871,421 exhibits an inflatable tube which exerts a force against a door and a door frame to seal the door against the vessel. The door is held in place by a separate locking device. The inflatable tube here is used to position the door for sealing by other devices rather than performing the sealing function itself.

The invention disclosed in U.S. Pat. No. 3,632,303 exhibits a pressure hose which can be pressurized to exert force via a lever bar to force the closure against the seal. The attachment of the closure to the vessel is achieved by a variation of the normal bolting method. Local operation by hand is essential in attaching the closure to the vessel.

The invention disclosed in U.S. Pat. No. 3,500,584 exhibits an inflatable seal which positions the closure against another seal with attachment of the closure being by means of a bolted apparatus.

These and similar devices all suffer from the disadvantage of requiring local hand operation to attach or remove the closure and sometimes they sacrifice the strength of a bolted flange in order to reduce removal time, resulting in warpage or seal failure.

U.S Pat. No. 4,820,384 disclosed a remotely operable apparatus for installing and removing a vessel cover from a large vessel. Specially shaped connector pins align the cover with the opening and attach the cover to a mounting rim around the opening of the vessel. An incrementally rotating ring secures the cover to the connector pins, then an actuator which expands under fluid pressure is used to force the cover into its final position firmly against the vessel opening. A second rotating ring wedges the cover in its final position for the duration of the operating cycle of the vessel. The installing and removing operations can be performed remotely, resulting in a high-strength closure which can be quickly removed and replaced.

SUMMARY OF THE PRESENT INVENTION

The cover positioner assembly is a remotely operable apparatus for installing and removing a vessel cover from a vessel. The cover positioner assembly can be used with any vessel having a mounting rim around the vessel opening. The cover positioner assembly includes a cover sized to fit against the mounting rim of the vessel. Specially designed connector pins mount to the mounting rim and secure the cover to the mounting rim. A rotating lock ring secures the connector pins to the cover positioner assembly and a force actuator expands under fluid pressure to force the cover into sealing engagement with the mounting rim. A ramp ring rotates to secure and lock the cover in the sealed position and the pressure in the force actuator is released for the duration of the operating cycle of the vessel. A ramp ring safety lock apparatus prevents the accidental rotation of the ramp ring and the breaking of the seal between the cover and the mounting rim of the vessel.

A quick-acting pipe connector assembly is also disclosed for making or breaking a quick pipe connection to the vessel cover. The quick-acting pipe connector assembly can be used to join two ends of pipe. A flange is mounted on the end of one pipe and the quick-acting pipe connector assembly includes a pipe end fitting sized to fit against the pipe flange. A force ring mounts to the pipe end fitting and specially designed connector pins mount to the force ring and secure the force ring to the flange. A rotating lock ring secures the connector pins to the flange and a force actuator expands under fluid pressure to force the pipe end fitting into sealing engagement with the flange. A ramp ring rotates to secure and lock the force ring in the sealed position for the duration of the pipe connection and the pressure in the force actuator is released.

BRIEF DESCRIPTION OF THE DRAWINGS

In order to more fully understand the drawings used in the detailed description of the present invention, a brief description of each drawing follows:

FIG. 5 is a partial cross-sectional elevation view showing the cover assembly in a raised position with the connector pins in an extended position;

FIG. 6 is a partial cross-sectional elevation view showing the upper and lower ramp rings in a disengaged position;

FIG. 7 is a partial cross-sectional elevation view showing the upper and lower ramp rings in an engaged position;

FIG. 8 is a cross-sectional elevation view of a ramp safety lock apparatus in an unlocked and retracted position;

FIG. 9 is a cross-sectional elevation view of the ramp safety lock apparatus in a locked position;

DETAILED DESCRIPTION OF THE INVENTION

Figure 1:
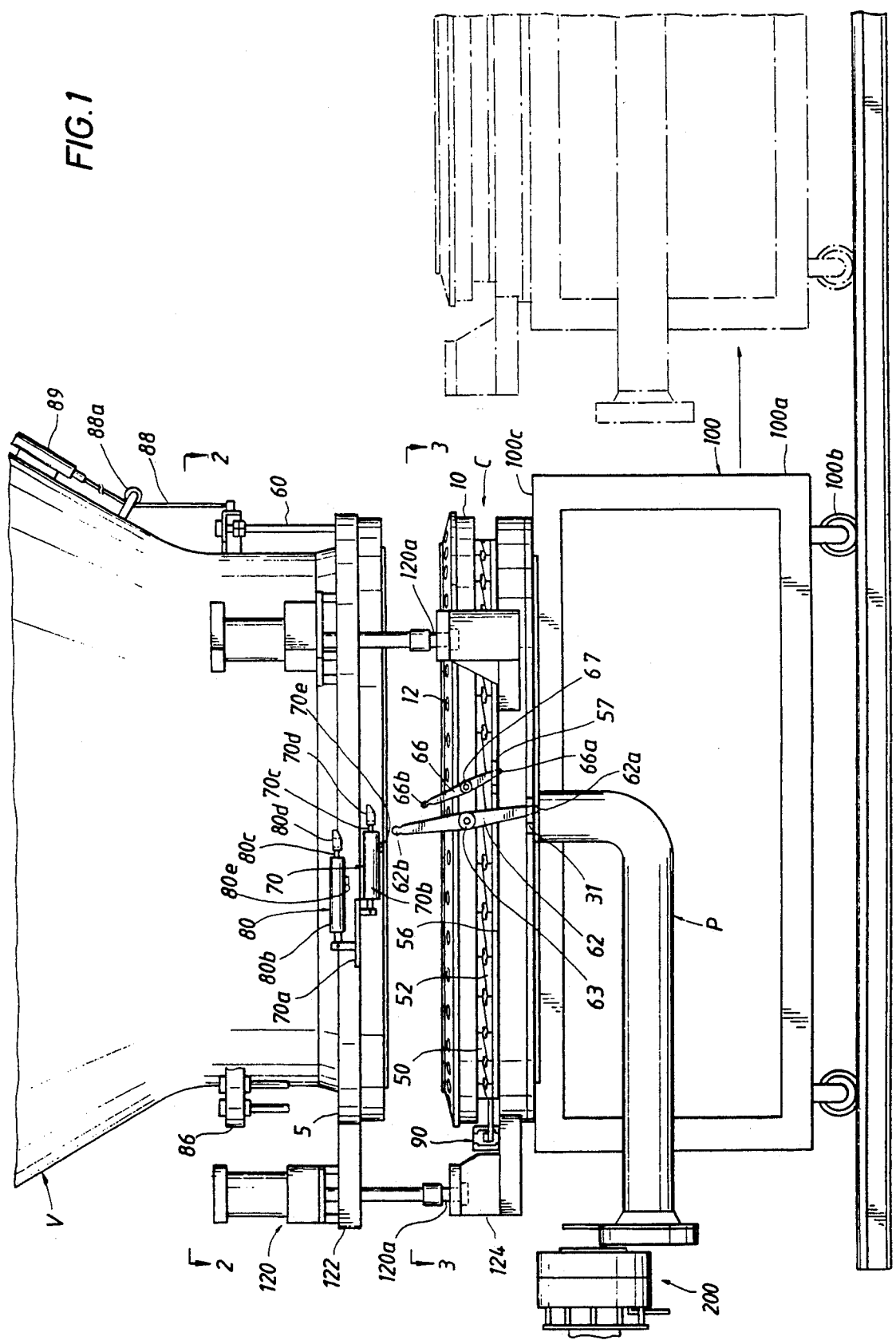
FIG. 1 is an elevation view of the remotely operable vessel cover positioner of the present invention illustrating the cover assembly in a lowered position on a dolly and showing the dolly transporting the cover assembly in phantom.
Figure 4:
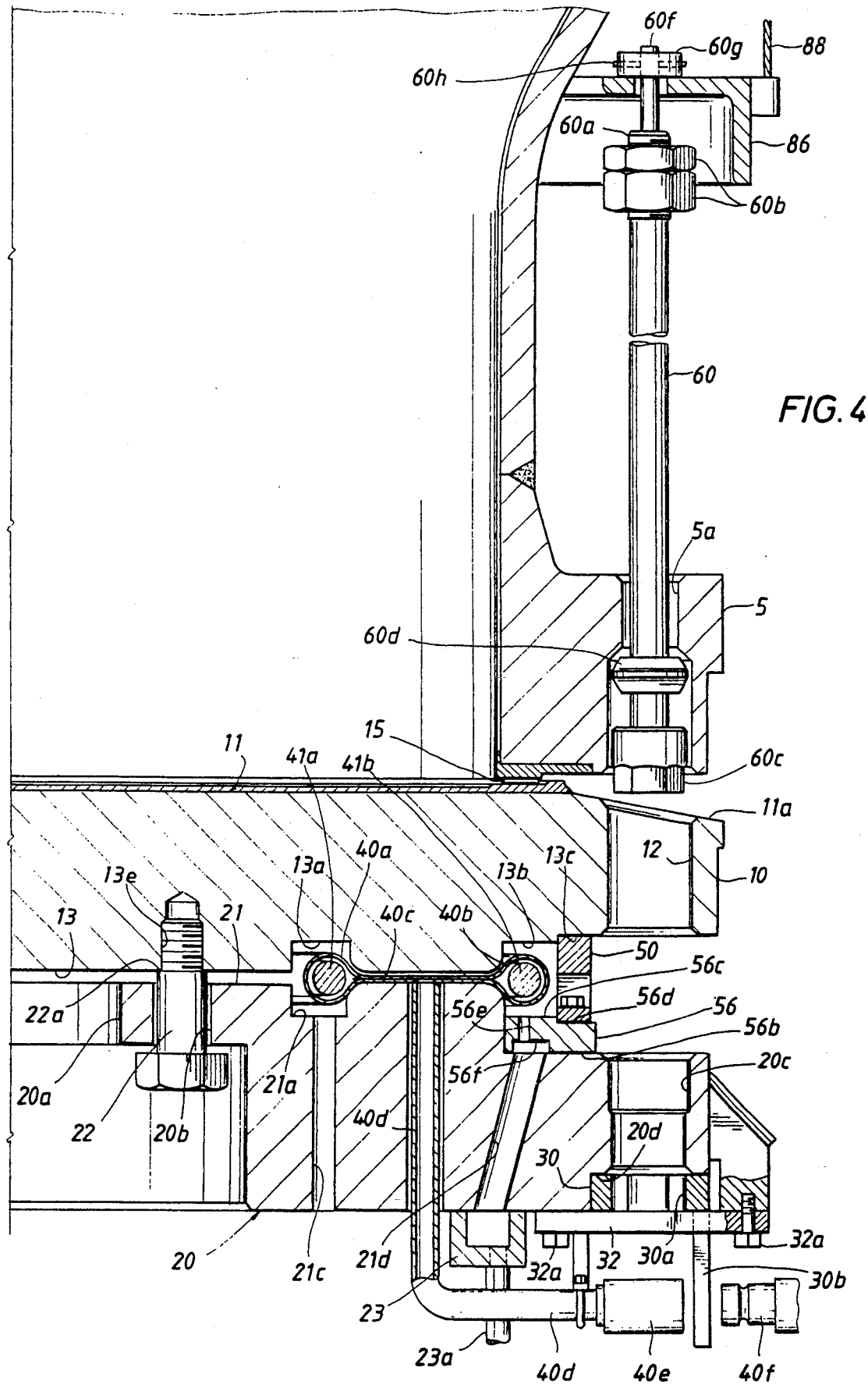
FIG. 4 is a partial cross sectional elevation view showing the cover assembly in a raised position with the connector pins in a retracted position.

The invention can readily be described as it is used on a typical coke oven or other vertical vessel with an opening on the bottom. Referring to FIG. 1, the vessel with which the invention is used is generally indicated as V. Such a vessel V would typically be relatively large and have a vertical axis and legs or other supporting structure not shown in the figure. A cover positioner assembly, generally depicted as C in FIG. 1, and including a cover 10, is generally attached to an opening in the vessel V which is normally a round opening of large diameter. The means of attachment is by attaching the cover 10 to a mounting rim, in this case a flange 5, which surrounds the opening, and which has circumferentially spaced holes 5a as shown in FIG. 4. The holes 5a in the vessel flange 5 extend through the flange 5 and include a lower bore 5b having a diameter greater than an upper bore 5c for reasons which will be explained below.

The vessel V is charged with a quantity of raw material and then heated and possibly maintained at an elevated pressure in performing the desired process, such as making coke. After the process is performed, the product is discharged by removing the cover 10 from the opening. A cart or dolly, generally designated as 100 in FIG. 1, is used to handle and transport the cover 10. This cart 100 can take various forms, but it will typically have a framework which includes legs 100a and wheels 100b which can roll on a track as illustrated or directly on the floor. The cart 100 includes a platform or other supporting surface 100c upon which the cover assembly C comes to rest after removal from the vessel V. The platform 100c includes a recessed portion (not shown) for receiving inlet piping, generally designated as P in FIG. 1. The inlet piping P is connected at one end to the cover 10 and a second end connects to a quick acting pipe connector assembly 200 which will be more fully described below.

Figure 2:
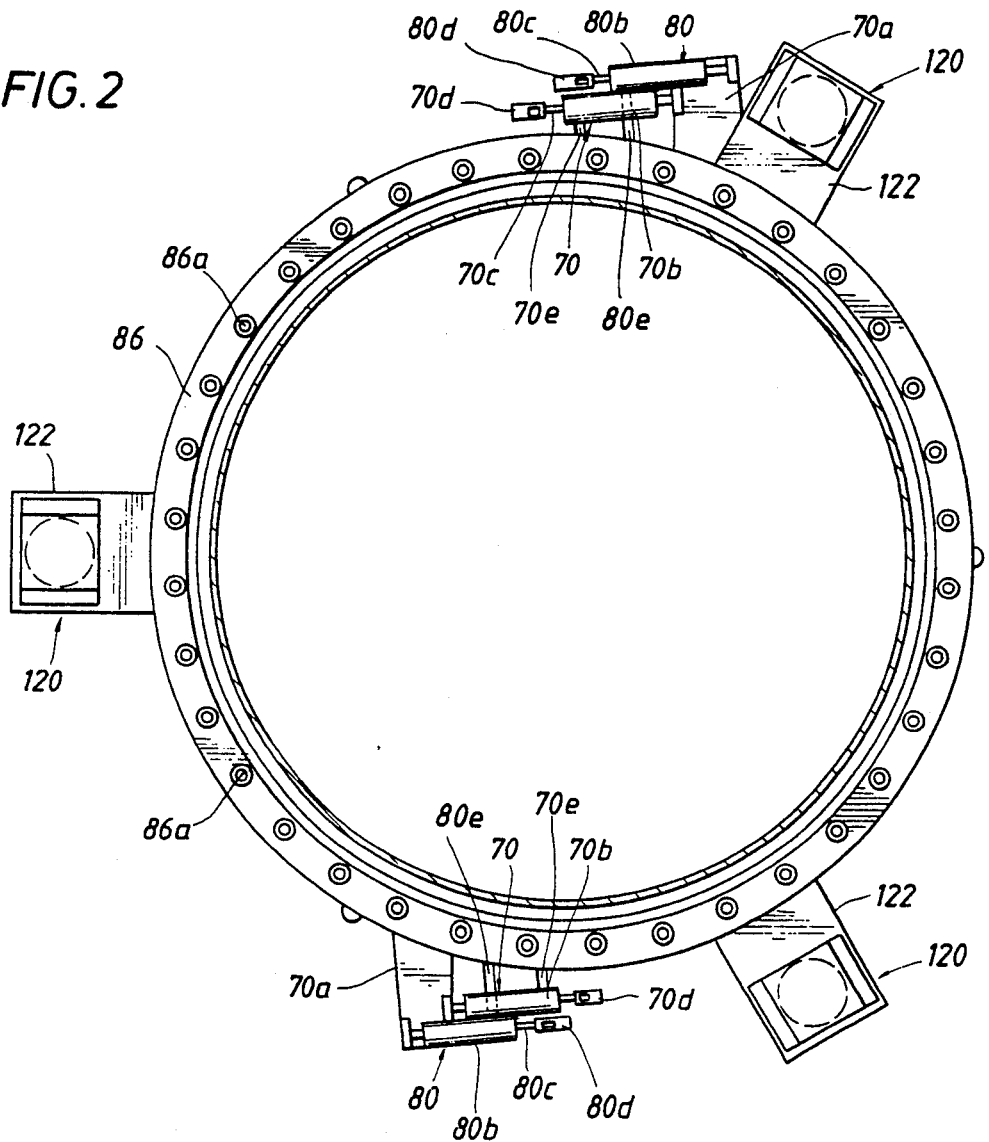
FIG. 2 is a plan view taken along line 2—2 in FIG. 1.
Figure 3:
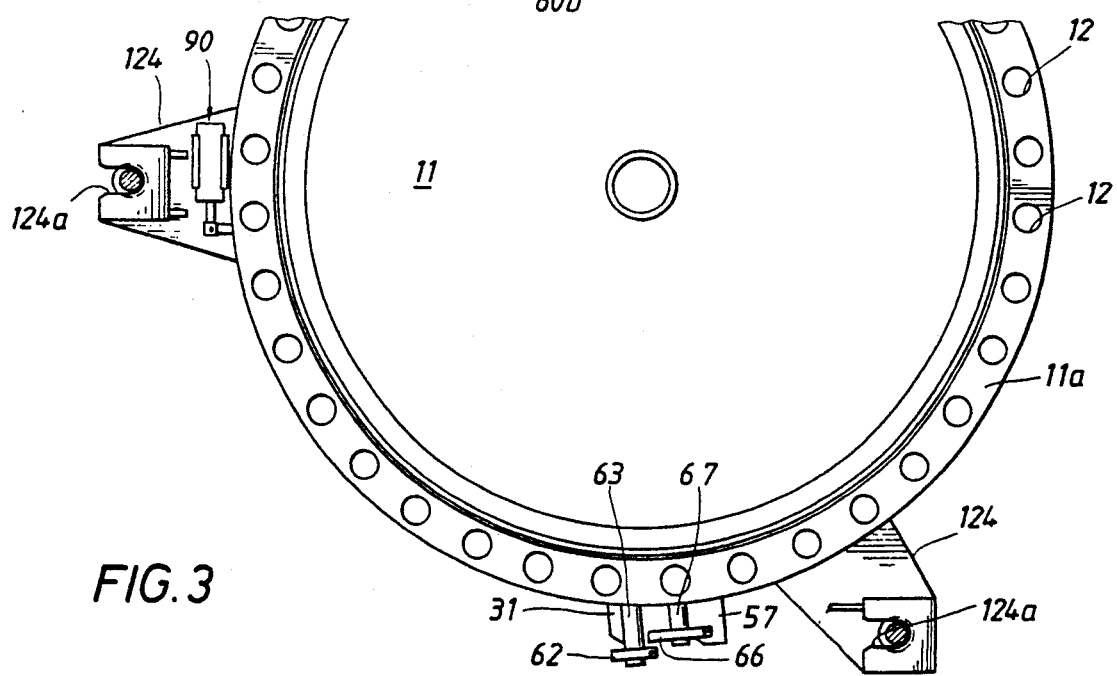
FIG. 3 is a partial plan view taken along line 3—3 in FIG. 1.

Referring to FIGS. 1 and 2, a plurality of cover lift cylinder assemblies 120 are mounted to the flange 5 of the vessel V with vessel lift cylinder brackets 122. Preferably, at least three such vessel lift cylinder assemblies 120 are equally spaced around the perimeter of the vessel V. Preferably, a single control (not shown) synchronously controls the plurality of cylinder assemblies 120. As shown in FIGS. 1 and 3, a corresponding set of cover lift cylinder brackets 124 are mounted to the cover assembly C. The cover lift cylinder brackets 124 include a slot 124a which receives an end portion 120a of the cover lift cylinder assemblies 120. The cover lift cylinder assemblies 120 are used to raise the cover assembly C to the flange 5 of the vessel and to lower the cover assembly C from the flange 5 to the platform 100c of the cart 100.

In order to look more closely at the cover positioner assembly C, refer to FIGS. 4 and 5, where it will be seen that the cover 10 mates with the vessel flange 5 with the necessary seal being provided by a gasket 15. The cover 10 in the preferred embodiment is a circular disc having a generally flat upper surface 11 including a downwardly tapered outer portion 11a. The downwardly tapered outer portion 11a includes a plurality of circumferentially spaced holes 12 corresponding to the circumferentially spaced holes 5a of the vessel flange 5. A generally flat lower surface 13 of the cover 10 includes annular recesses 13a, 13b machined into the lower surface 13 of the cover 10 to provide a location for a force actuator 40 which will be more fully described later.

A third annular recess 13c is machined on the outer periphery of the cover 10 just inside the circumferentially spaced holes 12 to provide a location for a plurality of upper ramps 50. The plurality of upper ramps 50, which can be seen in more detail in FIGS. 6 and 7, are wedge-shaped arcuate sections having a substantially flat upper surface 50a which bears against the third annular recess 13c of the cover 10 and a slanted planar lower surface 50b which interacts with a corresponding slanted planar upper surface 52b of a lower ramp 52. The upper ramp 50 includes step portions 50c, 50d at opposite ends of the upper ramps 50 which overlap with step portions 50d, 50c respectively of adjoining upper ramps 50. Each upper ramp 50 also includes a blind bore 50e opening in the upper surface 50a which receives a stab post 54 extending downwardly from the third annular recess 13c of the cover 10. A through bore 50f extends through the upper ramp 50 from the upper surface 50a to a lower cutout section 50g. A ramp connecting bolt 55 is inserted through the through bore 50f and threadably engages a threaded hole 13d in the cover 10 to removably fasten the upper ramp 50 to the cover 10. The upper ramp 50 is thus held in place with the ramp connecting bolt 55, the stab post 54, and the overlapping step portions 50c and 50d. The cutout section 50g provides adequate clearance for the connecting bolt head 55a to avoid obstruction with the lower ramp 52, as will be further described below.

Still referring to FIGS. 6 and 7, the plurality of lower ramps 52 are similar to the upper ramps 50 and are wedge-shaped arcuate sections having a substantially flat lower surface 52a which bears against a lower ramp ring 56. The lower ramps 52 have a slanted planar upper surface 52b which interacts with the corresponding slanted planar surface 50b of the upper ramp 50. The lower ramp 52 includes step portions 52c, 52d at opposite ends of the lower ramps 52 which overlap with step portions 52d, 52c, respectively, of adjoining lower ramps 52. Each lower ramp includes a blind bore 52e opening in the lower surface 52a which receives a stab post 58 extending upwardly from the lower ramp ring 56. A through bore 52f extends through the lower ramp 52 from the lower surface 52a to an upper cutout section 52g. A lower ramp connecting bolt 59 is inserted through the through bore 52f and threadably engages a threaded hole 56a in the lower ramp ring 56 to removably fasten the lower ramp 52 to the lower ramp ring 56. The lower ramp 52 is held in place with the ramp connecting bolt 59, the stab post 58, and the overlapping step portions 52c and 52d. The cutout section 52g provides adequate clearance for the connecting bolt head 59a to avoid obstruction with the upper ramp 50.

As shown in FIG. 1, the upper ramps 50 are mounted to the cover 10 and are joined end to end in an overlapping relationship to form a complete circle around the outer periphery of the force actuator 40 and within the periphery of the plurality of circumferentially spaced holes 12 of the cover 10. The lower ramps 52 are mounted to the lower ramp ring 56 and are similarly joined end to end forming a complete circle substantially the same size as formed by the upper ramps 50 such that the slanted planar surfaces 50b, 52b interact and cooperatively contact one another when engaged a will be described below.

Referring to FIGS. 4 and 5, the cover 10 rests indirectly upon a force ring 20 which is an annular structure having an annular support flange 20a around the internal periphery of the force ring 20. The annular support flange 20a includes a plurality of spaced holes 20b extending therethrough which correspond to a plurality of spaced threaded holes 13e in the cover 10. A force ring retaining bolt 22 having a shoulder 22a is inserted through the hole 20b in the support flange 20a and threadably engages with the hole 13e. The retaining bolt 22 is advanced into the threaded hole 13e until the shoulder 22a abuts the lower surface 13 of the cover 10. The retaining bolt 22 has a length between the shoulder 22a and the bolt head that is slightly greater than the thickness of the support flange 20a so that the force ring 20 is loosely attached to the cover 10 with the force ring retaining bolts 22.

A generally flat upper surface 21 of the force ring includes annular recesses 21a, 21b machined into the upper surface 21 in opposing relationship to the annular recesses 13a, 13b, respectively, of the cover 10 to house inner annular ring 40a and outer annular ring 40b of the force actuator 40. The inner annular ring 40a has a tubular cross section and is positioned in the combined annular recesses 13a and 21a. The outer annular ring 40b has a tubular cross section and is positioned in the combined annular recesses 13b and 21b. The rings 40a, 40b are connected to one another by an inflation membrane 40c which joins the rings 40a and 40b and lies flatly between the lower surface 13 of the cover 10 and the upper surface 21 of the force ring 20 in the space between the rings 40a and 40b. In the preferred embodiment, the inner and outer annular rings 40a and 40b, respectively, and the inflation membrane 40c are made of metal, preferably stainless steel. An inner filler bar 41a and an outer filler bar 41b are positioned inside the inner and outer annular rings 40a and 40b, respectively. The filler bars 41a, 41b, are round steel bars forming a circle which are placed in the annular rings 40a, 40b, to reduce the amount of fluid needed to pressurize the force actuator 40. Fluid pressure is introduced to the inflation membrane 40c by pressure tube 40d through force ring 20 and thence the inflation membrane 40c to the rings 40a, 40b. A quick connect coupling 40e attached to the end of the pressure tube 40d detachably connects with a mating coupling 40f which is in communication with a pressure source (not shown). The fluid may be either a gas or a hydraulic-type liquid. The inflation membrane 40c will expand sufficiently upon inflation by pressurized fluid to raise the cover 10 with respect to the connector pins 60 as more fully described below.

Referring to FIG. 5, the annular recess 21b is machined on the periphery of the force ring 20 and has a depth sufficient to allow the lower ramp ring 56 to rest on the lower face of the annular recess 21b without interfering with outer annular ring 40b. The outer periphery of the annular recess 21b includes a plurality of circumferentially spaced holes 20c which align with the plurality of spaced holes 12 in the cover 10.

Referring to FIGS. 4 and 5, the ramp ring 56 is a flat ring having a smooth lower surface 56b which is permitted to slide on the lower surface of the annular recess 21b of the force ring 20. The ramp ring 56 has a substantially flat upper surface 56c having an outer periphery recess 56d for receiving the plurality of lower ramps 52. The ramp ring 56 includes a plurality of orifices 56e extending from the upper surface 56c to an annular recess 56f formed in the lower surface 56b of the ramp ring 56. The annular recess 56f is in fluid communication with a plurality of purge tubes 21d extending through the force ring 20 to the lower surface of the force ring 20. The purge tubes 21d are in fluid communication with an annular purging channel 23 attached to the lower surface of the force ring 20. A purging fluid inlet tube 23a feeds into the purging channel 23. The force actuator 40 can be purged or flushed with a purging fluid, such as water, by filling the purging channel 23 with fluid via the inlet tube 23a and continuing to fill so that the fluid fills the plurality of purge tubes 21d, then the annular recess 56f and the orifices 56e before filling the area around the force actuator 40. The fluid is allowed to drain between the upper and lower ramps 50, 52 and via a drain tube 21c in fluid communication with the annular recess 21a.

As shown in FIGS. 1, 2, and 3, the ramp ring 56 includes a pair of slotted ramp ring ears 57 attached to the perimeter of the ramp ring 56 and extending beyond the outer perimeter of the cover 10 and force ring 20. A ramp ring lever 66 is pivotally connected to a ramp ring lever pivot arm 67 which is firmly secured to the outer perimeter of the cover 10. As can be seen in FIG. 1, the ramp ring lever 66 has a lower end 66a which extends through the slotted ramp ring ear 57. The ramp ring lever 66 has an upper end 66b which is received by ramp ring rotation means 70 mounted via cylinder bracket 70a. The ramp ring rotation means 70 includes a pivotably mounted hydraulic cylinder assembly 70b oriented tangentially with respect to the cover 10. The end of an extending ram 70c of the hydraulic cylinder assembly 70b includes a slotted receiver 70d which receives and engages the upper end 66b of the ramp ring lever 66. As shown in FIG. 1, as the cover assembly C is raised to the mounting rim 5, the upper end 66b of the ramp ring lever 66 is slightly forward of the slotted receiver 70d. As the ram 70c is extended, the pivotably mounted cylinder assembly 70b allows the cylinder assembly 70b to pivot upwards as the slotted receiver 70d engages the upper end 66b of the ramp ring lever 66. A cylinder assembly stop 70e is attached to the flange 5 to limit the downward movement of the cylinder assembly 70b. An identical ramp ring lever 66 assembly with ramp ring rotation means 70 is also provided on the opposite site of the cover 10 to facilitate the rotation of the ramp ring 56 during the final positioning of the cover positioner assembly C as will be explained below.

Referring to Figs. 1, 3, 4, and 13, lock ring 30 is an annular ring having a plurality of circumferentially spaced holes 30a which align with the holes 20c in the force ring 20. The lock ring 30 is mounted for rotation in a recessed annular portion 20d in the lower surface of the force ring 20. The lock ring 30 rests on a lock ring support plate 32 which is attached by support plate bolts 32a to the force ring 20. The lock ring 30 engages and locks a plurality of connector pin assemblies 60 which extend through the plurality of circumferentially spaced holes in the flange 5, the cover 10, and the force ring 20. Each connector pin 60 has threads 60a on one end onto which nuts 60b are threaded. On the end of connector pin 60 distal from the threads 60a is head 60c. In the preferred embodiment, the end of the head 60c is hexagonal shaped to allow a standard wrench to be used to prevent rotation during the adjustment of the nuts 60b. The connector pin 60 includes a shoulder 60d near the head 60c for radially aligning the connector pins 60 in the hole 20c in the force ring 20.

Figure 13:
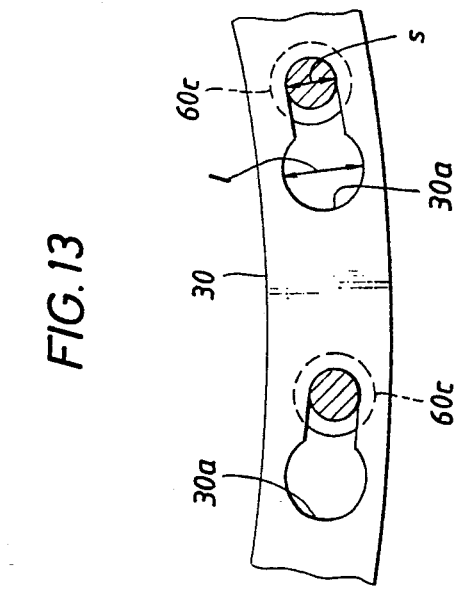
FIG. 13 is a partial plan view of the lock ring showing the details of the keyhole openings.
Figure 11:
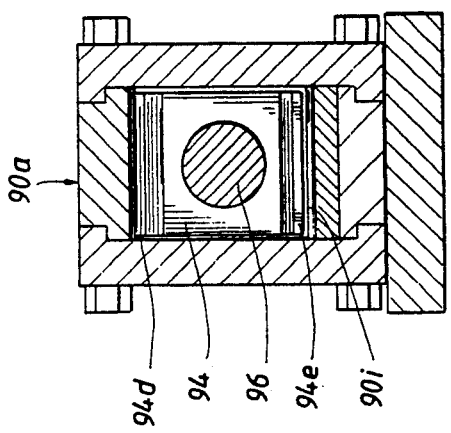
FIG. 11 is a view taken along line 11—11 in FIG. 10.

As shown in FIG. 13, the lock ring 30 has keyhole shaped openings 30a which have large diameter 1 and small diameter s. Large diameter 1 is slightly larger than the diameter of the connector pin head 60c and small diameter s is smaller than the diameter of connector pin head 60c but slightly larger than the diameter of the shank of the connector pin 60.

As shown in FIGS. 1, 2, and 3, the lock ring 30 includes a pair of slotted lock ring ears 31 attached to the perimeter of the lock ring 30 and extending beyond the outer perimeter of the cover 10 and force ring 20. A lock ring lever 62 is pivotally connected to a lock ring lever pivot arm 63 which is firmly secured to the outer perimeter of the cover 10. As can be seen in FIG. 1, the lock ring lever 62 has a lower end 62a which extends through the slotted lock ring ear 31. The lock ring lever 62 has an upper end 62b which is received by lock ring rotation means 80 mounted via cylinder bracket 70a. The lock ring rotation means 80 includes a pivotably mounted hydraulic cylinder assembly 80b oriented tangentially with respect to the cover 10. The end of an extending ram 80c of the hydraulic cylinder assembly 80b includes a slotted receiver 80d which receives and engages the upper end 62b of the lock ring lever 62. As shown in FIG. 1, as the cover assembly C is raised to the mounting rim 5, the upper end 62b of the lock ring lever 62 is slightly forward of the slotted receiver 80d. As the ram 80c is extended, the pivotably mounted cylinder assembly 80b allows the cylinder assembly 80b to pivot upwards as the slotted receiver 80d engages the upper end of 62b of the lock ring lever 62. A cylinder assembly stop 80e is attached to the flange 5 to limit the downward movement of the cylinder assembly 80b. An identical lock ring lever 62 assembly with lock ring rotation means 80 is also provided on the opposite side of the cover 10 to facilitate the rotation of the lock ring 30 during the initial positioning of the cover positioner assembly C as will be explained below.

Referring to FIGS. 4 and 5, an interference plate 30b is connected to the lock ring 30. The interference plate 30b extends downwardly as shown in FIGS. 4 and 5 to a position in front of or to the side of a quick connect coupling 40e depending on the position of the lock ring 30 for reasons which will be explained below.

Referring to FIG. 5, the connector pins 60 include a longitudinal blind bore 60e in the threaded end of the connector pins 60 for receiving a first end of a lift rod 60f. As shown in FIGS. 1, 2, and 5, a pin lift ring 86 is an annular ring having a plurality of circumferentially spaced holes 86a in spaced relationship to the plurality of spaced holes 5a in the flange 5. The spaced holes 86a in the pin lift ring 86 extend over the upper end of the lift rods 60f.

The upper end of the lift rods 60f receive a cap 60g which attaches to the lift rods 60f. The cap 60g may be attached by various means but is shown in Figs. 4 and 5 to be attached with a pin 60h extending through the cap 60g and the lift rod 60f. A plurality of lift ring lifting cables 88 are connected to the periphery of the lift ring 86 as shown in FIGS. 1, 4, and 5. Preferably, there are at least three lifting cables 88 at equal spacings around the circumference of the vessel V although only one is shown in FIG. 1 for clarity purposes. As shown in FIG. 1, an upper end of each lifting cable is connected to a lift ring hydraulic cylinder 89 which is mounted to the vessel V. The stroke of the lift ring hydraulic cylinder 89 raises and lowers the pin lift ring 86 which in turn raises and lowers the plurality of connector pins 60. As shown in FIG. 1, a lift ring pulley assembly 88a is attached to the vessel V at a location such that the lifting cable 88 is maintained in a substantially vertical position between the pin lift ring 86 and the pulley assembly 88a. This configuration enables the connector pins 60 and the pin lifting ring 86 to be vertically raised and lowered without misalignment.

FIGS. 8, 9, 10, and 11 show a ramp safety lock apparatus 90 having a housing 90a which has an enlarged cavity in the mid portion of the housing 90a. The housing 90a has a first end 90c with a bore 90d extending through the first end 90c to the cavity 90b and finally through a second end 90e of the housing 90a. As shown in FIGS. 1 and 3, the second end 90e of the housing 90a is pivotably connected with fastener 98a to a lifting support member 98 which is securely mounted to the periphery of the force ring 20.

Figure 10:
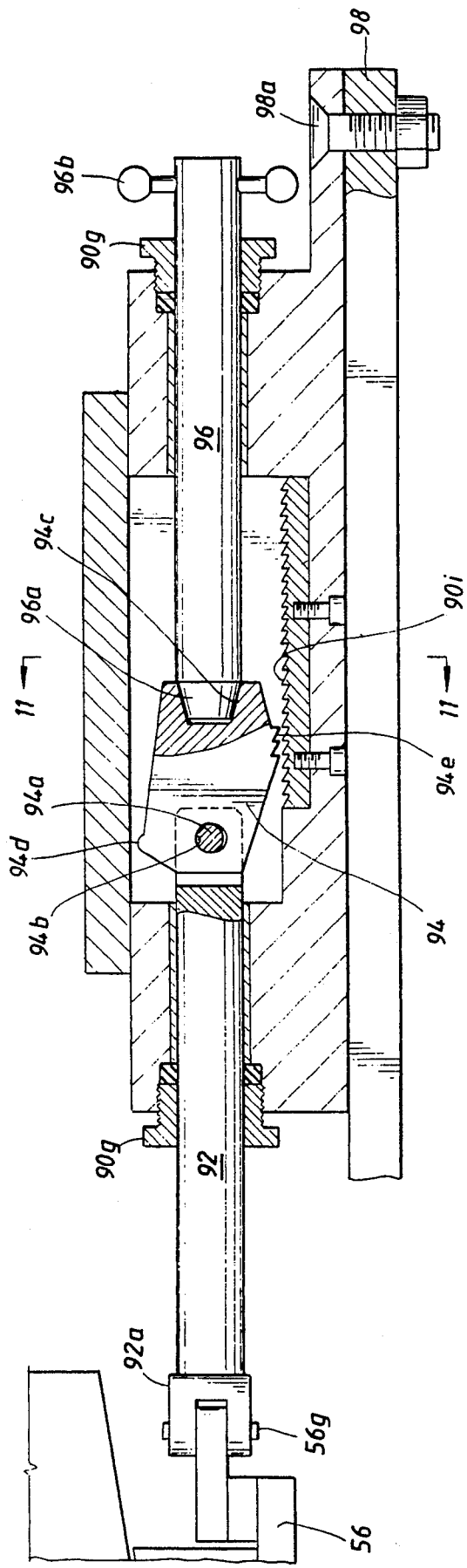
FIG. 10 is a cross-sectional elevation view of the ramp safety lock apparatus showing the lock in the process of being unlocked.

A pair of bushings 90f are fitted within the bores 90d, and a pair of packing glands 90g are threadably engaged with the bores 90d at the first and second ends 90c, 90e of the housing 90a. A connector rod 92 is pivotably connected at a first end 92a to the ramp ring 56 with a ramp ring pivot pin 56g. The connector rod 92 includes a second end 92b which slidably extends through the bore 90d in the first end 90c of the housing 90a. The second end 92b of the connector rod 92 is pivotably connected to a gripper 94 via a gripper pin 94a which is inserted through a gripper opening 94b and a hole in the second end 92b of the connector rod 92. In the preferred embodiment as shown in FIGS. 8-10, the opening 94b is oval in shape with the long axis of the oval being substantially vertical for reasons to be explained below. The gripper 94 includes an inwardly tapered recess 94c in an end facing the second end 90e of the housing 90a. The inwardly tapered recess 94c receives a tapered end 96a of a plunger rod 96 which extends through the bore 90d in the second end 90e of the housing 90a. The distal end of the plunger rod 96 includes a handle 96b for inserting and withdrawing the plunger rod 96 in the housing 90a. The gripper 94 includes an upper ridge 94d on the upper face of the gripper 94 and a plurality of teeth 94e on the lower face of the gripper 94. A lower surface 90h of the cavity 90b includes a plurality of teeth 90i capable of engaging the teeth 94e of the gripper 94. Gravity will cause the gripper teeth 94e to engage the housing teeth 90i as shown in FIG. 9. The configuration of the teeth 90i and 94e and the pivot connection of the gripper 94 allows the gripper teeth 94e to travel along the housing teeth 90i in a direction towards the first end 90c of the housing 90a as the connector rod 92 is withdrawing from the housing 90a. Also, as shown in FIG. 9, a centerline 96, of the plunger rod 96 is slightly offset above a centerline 94' of the tapered recess 94c when the teeth 90i, 94e are engaged; however, when the plunger rod 96 is inserted in the housing 90a to a point where the tapered end 96a enters the tapered recess 94c of the gripper 94 and is fully received by the tapered recess 94c, the gripper 94 pivots about the gripper pin 94a and raises to a position where the teeth 90i, 94e are no longer engaged as shown in FIG. 10. Thus, so long as the plunger rod 96 maintains the gripper teeth 94e in the raised position, the connector rod 92 is permitted to slide into the housing 90a. The significance of this ramp safety lock apparatus 90 will be explained in the operation of the preferred embodiment which follows.

Figure 12:
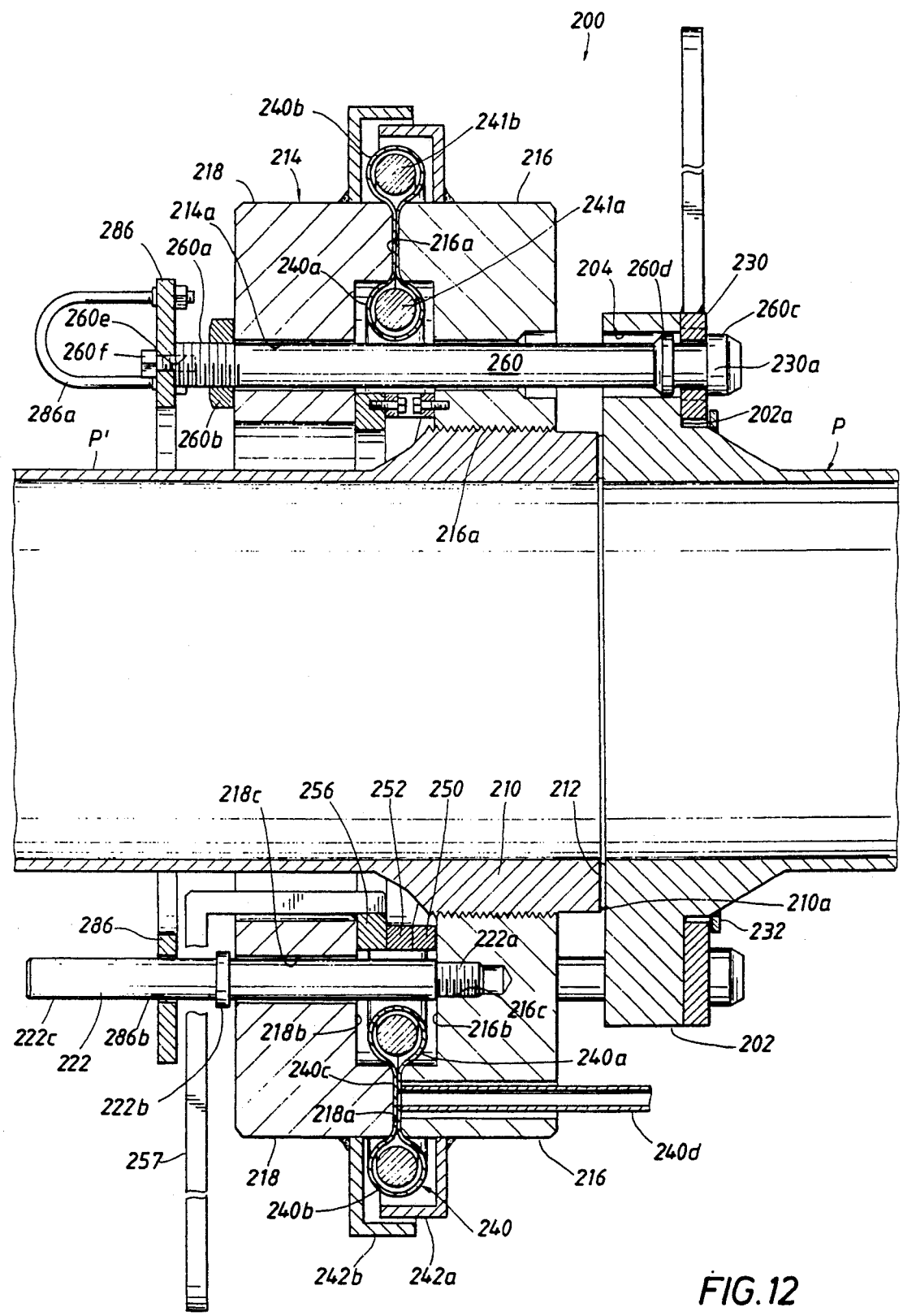
FIG. 12 is a cross-sectional view of a quick acting pipe connector assembly of the present invention.
Figure 14:
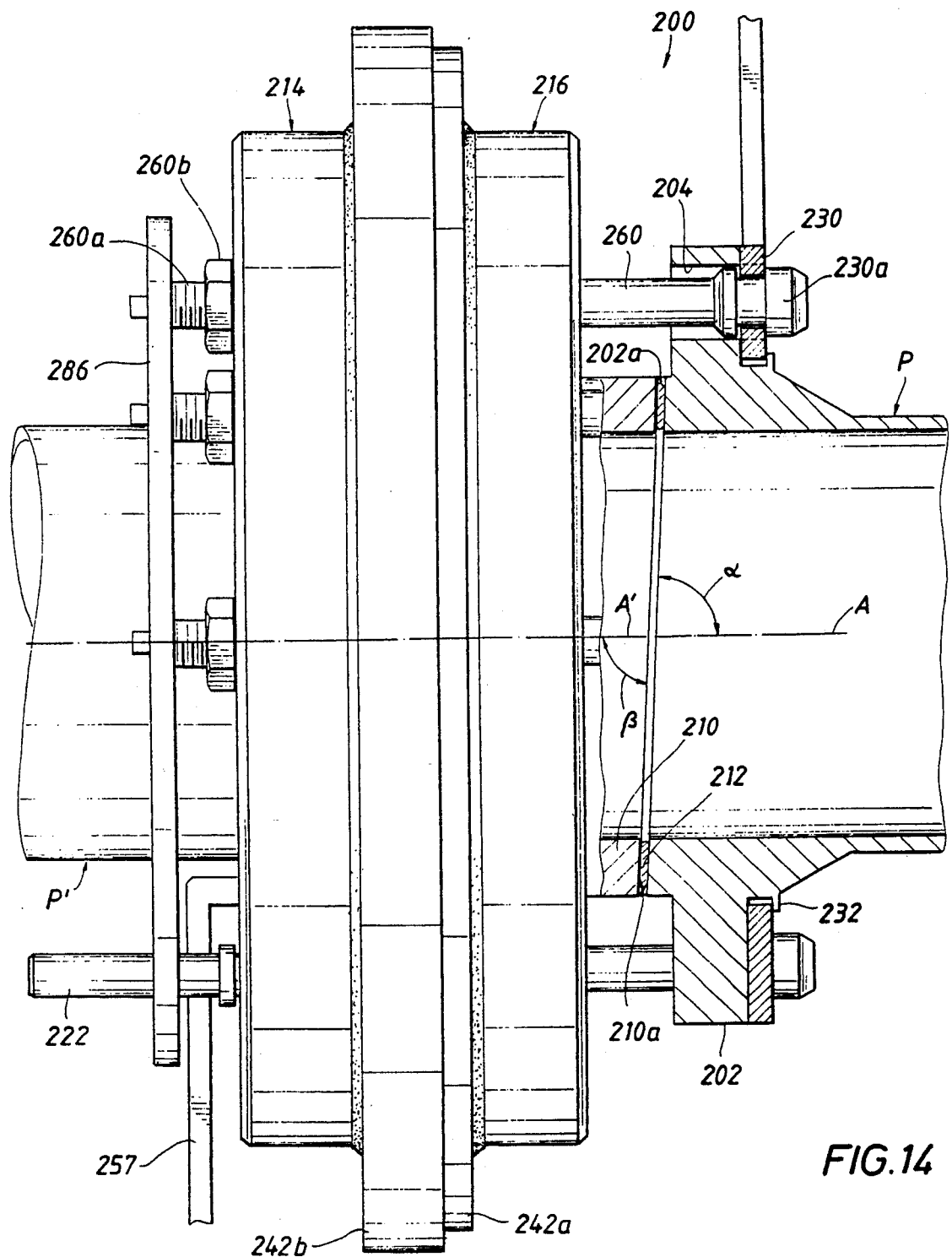
FIG. 14 is a partial cross-sectional elevation view of a second embodiment of the quick-acting pipe connector assembly of the present invention.

Referring to FIGS. 1, 12, and 14, a quick-acting pipe connector assembly 200 is shown attached to an end of the inlet piping P. The quick-acting pipe connector assembly 200 is structurally very similar to the cover positioner assembly C described above. Thus, elements that are structurally similar will be identified by the same name with a different reference numeral and it may be necessary to refer to some of the drawings pertaining to the cover positioner assembly C to more fully understand the structural features of the corresponding elements of the quick-acting pipe connector assembly 200.

The end of the inlet piping P includes a flange 202 having a plurality of circumferentially spaced holes 204. A lock ring 230, similar to the lock ring 30 discussed above, is an annular ring having a plurality of circumferentially spaced keyshaped openings 230a which align with the holes 204 in the flange 202. The key-shaped openings are similar to the openings 30a in the lock ring 30 as shown in FIG. 13. The lock ring 230 is mounted for rotation at a rear face 202a of the flange 202 and is held in place with a lock ring support plate 232 which is welded to the flange 202.

Referring to FIG. 12, the mating pipe P' includes a threaded end fitting 210 having a smooth, flat end 210a that mates with the piping flange 202 with the necessary seal being provided by a gasket 212. A force ring 214 is an annular structure comprising a fixed force ring 216 and a movable force ring 218. The fixed force ring 216 includes an internally threaded opening 216a which engages the threaded end fitting 210 of the mating pipe P'. The force ring 214 includes a plurality of circumferentially spaced holes 214a extending through the fixed and movable force rings 216, 218 which correspond to the plurality of spaced holes 204 in the flange 202.

The lock ring 230 engages and locks a plurality of connector pin assemblies 260 which extend through the plurality of circumferentially spaced holes 214a, 204, and 230a in the force ring 214, flange 204, and the lock ring 230, respectively. Each connector pin 260 has threads 260a on one end onto which a nut 260b is threaded. On the end of connector pin 260 distal from the threads 260a is head 260c. The connector pin 260 includes a shoulder 260d near the head 260c for radially aligning the connector pins 260 in the hole 214a in the force ring 214.

Referring to FIG. 12, the connector pins 260 include a longitudinal threaded bore 260e in the readed end of the connector pins 260 for receiving a threaded end of a lift screw 260f. A lift ring 286 has a plurality of circumferentially spaced holes in spaced relationship to the plurality of spaced holes 214a in the force ring 214. The spaced holes 286a in the lift ring 286 align with the threaded bores 260e in the connector pins 260 and the lift screws 260f secure the lift ring 286 to the ends of the connector pins 260. The lift ring 286 includes a pair of handles 286a for removing or inserting the connector pins 260 through the flange holes 204.

The fixed and moveable force rings 216 and 218 are held together with a plurality of guide bolts 222 having a threaded end portion 222a. The guide bolts 222 are inserted through a guide bolt bore 218c in the moveable force ring 218 and then threadably engage with a threaded bore 216c in the fixed force ring 216. The guide bolt 222 includes a shoulder 222b located slightly beyond the outer face of the moveable force ring 218. The shoulder 222b limits the travel of the moveable force ring 218 from the fixed force ring 216. The guide bolt 222 also includes an extending portion 222c which extends through guide bolt openings 286b in the lift ring 286. The guide bolt extending portions 222c serve to maintain the connector pins 260 in alignment with the holes when the connector pins 260 are retracted.

The fixed force ring 216 includes a generally flat mating surface 216a having an annular recess 216b machined into the mating surface 216a. The movable force ring 218 also includes a generally flat mating surface 218a having an annular recess 218b. The annular recesses 216b, 218b are in opposing relationship to one another and provide a location for an inner annular ring 240a of a force actuator 240. An outer annular ring 240b is positioned outside of the mating surfaces 216a, 218a, enclosed by a pair of annular outer shields 242a and 242b attached to the fixed and movable force rings 216 and 218 respectively. The rings 240a, 240b are connected to one another by an inflation membrane 240c which joins the rings 240a and 240b and lies flatly between the mating surfaces 216a and 218a of the fixed and moveable force rings 216 and 218, respectively, in the space between the rings 240a and 240b. In the preferred embodiment, the inner and outer annular rings 240a and 240b, respectively, and the inflation membrane 240c are made of metal, preferably stainless steel. An inner filler bar 241a and an outer filler bar 241b are positioned inside the inner and outer annular rings 240a and 240b, respectively. The filler bars 241a, 241b are round steel bars forming a circle which are placed in the annular rings 240a, 240b, to reduce the amount of fluid needed to pressurize the force actuator 240. Fluid pressure is introduced to the inflation membrane 240c by pressure tube 240d through fixed force ring 216 and thence the inflation membrane 240c to the rings 240a, 240b. The fluid may be either a gas or a hydraulic-type liquid. The inflation membrane 240c will expand sufficiently upon inflation by pressurized fluid to position the end face 210a of the pipe end fitting 210 firmly against the gasket 212 as more fully described below.

The inner periphery of the annular recess 216b of the fixed force ring 216 provides a location for a plurality of fixed ramps 250 which are similarly shaped and attached to the fixed force ring 216 as the upper ramps 50 are to the cover 10 as previously described. The inner periphery of the annular recess 218b of the moveable force ring 218 provides a location for a plurality of moveable ramps 252 which are similarly shaped and attached to a ramp ring 256 as the lower ramps 52 are to ramp ring 56 as previously described. The ramp ring 256 has a handle 257 attached to the ramp ring 256 for rotating the ramp ring 256 and the moveable ramps 252 as will be explained below.

A second embodiment of the quick-acting pipe connector assembly 200 is shown in FIG. 14 in which an end face 202a of the flange 202 is not perpendicular to the longitudinal axis A of the pipe P. Instead, the flange end face 202a forms an angle $\alpha$ with the longitudinal axis A of the pipe P of approximately 2°-5° from perpendicular to the longitudinal axis A. Similarly, the end face 210a of the pipe end fitting 210 is not perpendicular to the longitudinal axis A' of the pipe P'. The end face 210a forms an angle $\beta$ with respect to the longitudinal axis A'. As shown in FIG. 14, the angle $\alpha$ equals the angle $\beta$. The reasons for the angled end faces 202a and 210a will be explained below in the operation of the invention.

OPERATION OF THE INVENTION

The operation of the preferred embodiment will now be described. As seen in FIG. 1, a cart 100 can be used to move the cover positioner assembly C into general alignment with the vessel opening. The end portions 120a of the cover lift cylinder assemblies 120 are downwardly extended and the connector pins 60 are in the raised position as the cart 100 approaches with the cover positioner assembly C as shown in FIG. 1. The slots 124 of the cover lift cylinder brackets 124 receive the downwardly extending end portions 120a. The cover lift cylinder assemblies 120 then raise the cover positioner assembly C into contact with the vessel flange 5 and maintain alignment of the holes 5a in the vessel flange 5 with the corresponding holes 12 in the vessel cover 10. As seen in FIG. 4, the vessel cover 10 contacts the gasket 15 at the perimeter of the opening. After the cover positioner assembly C has been raised to the flange 5, the upper ends 62b and 66b of the lock ring lever 62 and the ramp ring lever 66, respectively, are received by the slotted receivers 80d and 70d of the lock ring rotation means 80 and the ramp ring rotation means 70, respectively, by extending the respective cylinder rams 80c and 70c.

The lift ring hydraulic cylinder 89 is then activated to lower the pin lift ring 86 which allows the connector pins 60 to pass through the aligned corresponding holes 12, 20c, and 30a in the cover 10, force ring 20, and the lock ring 30, respectively. The connector pin 60 is attached to the vessel flange 5 by the nuts 60b with the axial alignment being maintained in the holes by the shoulder 60d and the connector pin head 60c. As shown in FIG. 5, the nuts 60b are located so that when the nuts 60b come to rest against the flange 5, the portion of the connector pin 60 between the head 60c and the shoulder 60d will be positioned in the hole 30a of the lock ring 30. As shown in FIG. 4, shaped as the connector pin 60 is being lowered, the keyhole shaped opening 30a of the lock ring 30 is oriented so that the large diameter 1 is aligned to allow the head 60c to pass through the opening 30a. The hydraulic cylinder assembly 80b of the lock ring rotation means 80 then rotates the lock ring 30 so that the small diameter s of the opening 30a is positioned between the pin head 60c and the shoulder 60d as shown in FIG. 5. This operation locks the connector pin head 60c below the lock ring 30 which in turn supports the force ring 20.

As shown in FIG. 4, when the lock ring 30 is in its unlocked position, the interference plate 30b is positioned in front of the quick connect coupling 40e to prevent the premature inflation of the force actuator 40. As the lock ring is rotated to the locked position as shown in FIG. 5, the interference plate 30b is rotated to the side of the quick connect coupling 40e, thus permitting the mating coupling 40f to be connected to the coupling 40e. After the lock ring 30 is rotated into its locking position with respect to the connector pin head 60c and the pressure source connection is made, fluid pressure is applied via the pressure tube 40d to the force actuator 40. This pressurizes the inflation membrane 40c and both the inner annular ring 40a and the outer annular ring 40b. When under pressure as shown in FIG. 5, the inflation membrane 40c and the rings 40a and 40b expand, reacting against the force ring 20, which is held in place by the lock ring 30 and the connector pins 60, and the cover 10. The resulting force against the cover 10 presses it firmly against the gasket 15. In order to prevent permanent deformation of the rings 40a and 40b, the travel of the cover 10 is limited by the force ring retaining bolt 22 threadably engaging the cover 10. Expansion of the inflation membrane 40c and annular rings 40a and 40b serves to substantially uniformly prestress the connector pins 60 to desired magnitude as a group, which also serves to prestress the cover 10. The advantage of prestressing, as is known in the art, is to serve to load the connector pins 60 and the cover so as to maintain a desired pre-load even under the stress of operation.

Referring to FIG. 6, it can be seen that prior to the inflation of the force actuator 40, the upper ramps 50 attached to the cover 10 are disengaged but in contact with the lower ramps 52 attached to the ramp ring 56 and each upper ring 50 is positioned substantially above the corresponding lower ring 50. After the lock ring 30 is rotated into place and after the force actuator 40 is pressurized to raise the cover 10 into sealing engagement with the gasket 15, a small gap forms between the upper ramps 50 and the lower ramps 52. The hydraulic cylinder assembly 70b of the ramp ring rotation means 70 then rotates the ramp ring 56 and the connected lower ramps 52 so that the small gap between the upper and lower ramps 50 and 52 is eliminated. The ramp ring 56 is rotated until the lower ramps 52 firmly contact the upper ramps 50 on the cover 10 as shown in FIG. 7. The angle of inclination of these ramps 50, 52 is sufficiently shallow so that friction between the ramps 50 and 52 of the cover 10 and the ramp ring 56 prevents the relative rotation of either part during vessel operation.

Referring to FIG. 8, the ramp safety lock apparatus 90 is initially in the unlocked and retracted position prior to the ramp ring 56 being rotated to firmly engage the upper and lower ramps 50 and 52. As the ramp ring 56 is rotated by the ramp ring rotation means 70, the connector rod 92 is pulled in a direction away from the housing 90a of the ramp safety lock apparatus 90 which in turn drags the pivotably mounted gripper 94 along the teeth 90i of the housing 90a as shown in FIG. 9. The teeth 94e of the gripper 94 engage the teeth 90i which prevents the ramp ring 56 from accidently being rotated to disengage the ramps 50 and 52 during operation of the vessel. If the ramp ring rotation means 70 attempts to disengagingly rotate the ramp ring 56 while the ramp safety lock apparatus 90 is locked, the connector rod 92 will forcibly attempt to enter into the housing 90a and the gripper 94 will oppose the insertion of the connector rod 92. The force applied to the gripper 94 by the connector rod 92 causes the upper ridge 94d to rise due to the oval shape of the opening 94b and bear against the upper surface of the cavity 90b while the gripper teeth 94e are engaged with the housing teeth 90i. Thus, the gripper 94 binds in the cavity 90b and locks the ramp ring 56. This insures that ramp ring 56 will not be disengagingly rotated unless the ramp safety lock apparatus 90 has been unlocked.

After the ramp ring 56 is rotated into place, the force actuator 40 is depressurized, allowing the inflation membrane 40c and the rings 40a and 40b to return to their original shape. The cover positioner assembly C remains in this condition until removal is required.

The quick-acting pipe connector assembly 200 is connected by positioning the flange 202 with the gasket 212 adjacent the flat end 210a of the pipe end fitting 210. This will be accomplished as the cover positioner assembly C is being raised to the flange 5 of the vessel V. As shown in FIG. 14, the second embodiment of the quick-acting pipe connector assembly 200 has angled end faces 202a and 210a. The end face 210a of the pipe end fitting 210 of the stationary pipe P' extends furthest from the fixed force ring 216 at its uppermost point and is nearest the fixed force ring 216 at its lowermost point. Conversely, the end face 202a of the flange 202 extends furthest from the flange 202 at its lowermost point and is nearest the flange 202 at its uppermost point. This positioning of the angled end faces 202a and 210a allows increased clearance between the end faces 202a and 210a when the cover positioner assembly C is being vertically raised to the flange 5 of the vessel V. When the pipes P and P' are longitudinally aligned as shown in FIG. 14, the end faces 202a and 210a are in opposing relationship separated by the gasket 212. Although not illustrated in FIG. 14, it is readily apparent that the longitudinal spacing between the end faces 202a and 210a increases as the pipe P and the cover positioner assembly C is vertically lowered. This minimizes contact between the end faces 202a, 210a and the gasket 212 during the installation and removal of the quick acting pipe connector assembly 200.

It is to be understood that the quick-acting pipe connector assembly 200 can be used independently of the cover positioner assembly C to form a quick and reliable connection between two pipe ends. In certain applications, it may be desirable to have the angled end faces 202a and 210a, whereas in other applications it may be preferable to have the end faces 202a and 210a perpendicular to the longitudinal axis of each pipe. For example, if the pipes being joined are permitted to move longitudinally with respect to one another or if the pipes are required to move transversely in more than one direction but not longitudinally, then it may be preferable to have end faces which are perpendicular to the longitudinal axis of each pipe. This embodiment, as shown in FIG. 12, is simpler to fabricate than the second embodiment, as shown in FIG. 14. The first embodiment also provides additional versatility in making up and breaking the pipe connection by allowing the pipes to move transversely in more than one direction without longitudinal movement. In other applications in which the one pipe will always move transversely to the other pipe and in substantially one direction, the second embodiment, as shown in FIG. 14, will provide added clearance between the end faces during transverse movement which minimizes damage and misalignment of the gasket 212. This also facilitates the making up and breaking of the pipe connection.

After the end faces 202a and 210a and the gasket 210 have been properly aligned, the lift ring 286 is forced towards the force ring 240 causing the heads 260c of the connector pins 260 to pass through the holes 204 in the flange 202 and the openings 230a in the lock ring 230. The lock ring 230 is then rotated so that the small diameter portion of the opening 230a located between the head 260c and shoulder 260d.

After the lock ring 230 is rotated into its locking position with respect to the connector pin head 260c, fluid pressure is applied via the pressure tube 240d to the force actuator 240. This pressurizes the inflation membrane 240c and both the inner annular ring 240a and the outer annular ring 240b. When under pressure, the inflation membrane 240c and the rings 240a and 240b expand, reacting against the fixed force ring 216, which is held in place by the threaded connection to the pipe end fitting 210, and the moveable force ring 218. The resulting force against the moveable force ring 218 causes it to apply force to the connector pins 260 via the nuts 260b which in turn stesses the connector pins 260 which are secured to the flange 202 by the lock ring 230. The final result is that the pipe end fitting 210 firmly seals with the gasket 212 and the flange 202 of the pipe P. In order to prevent permanent deformation of the rings 240a and 240b, the travel of the moveable force ring 218 is limited by the guide bolt 222 threadably engaging the fixed force ring 216.

After the force actuator 240 is pressurized to form the seal between the pipe end fitting 210 and the flange 202 with the gasket 212, the ramp ring 256 and the connected moveable ramps 252 are rotated via the handle 257 until the moveable ramps 252 firmly contact the fixed ramps 250 on the fixed force ring 216.

After the ramp ring 256 is rotated into place, the force actuator 240 is depressurized, allowing the inflation membrane 240c and the rings 240a and 240b to return to their original shape. The quick-acting pipe connector assembly 200 remains in this condition until removal is required.

To remove the quick-acting pipe connector assembly 200, the force actuator 240 is first pressurized and then the ramp ring 256 is rotated until the moveable ramps 252 disengage the fixed ramps 250. The force actuator 240 is then depressurized and the lock ring 230 is rotated until the connector pin heads 260c can pass through. At this point, the lift ring 286 is pulled away from the force ring 214 which withdraws all of the connector pins 260 from the flange 202 to a retracted position behind the plane of the flat end 210a of the pipe fitting 210 so that the pipe P and flange 202 can be lowered directly without having to be moved in a direction along the length of the pipe P.

To remove the cover positioner assembly C, the force actuator 40 is first pressurized and then the ramp safety lock apparatus 90 is unlocked by inserting the plunger rod 96 into the housing 90a to a point at which the plunger rod 96 enters the tapered recess 94c and forces the gripper to pivot upwardly to fully seat the tapered end 96a of the plunger rod 96. As the plunger 94 upwardly pivots, the gripper teeth 94e disengage with the housing teeth 90i which allows the connector rod 92 to enter into the housing 90a as the ramp ring 56 is rotated by the ramp ring rotation means 70 as sequentially shown in FIGS. 9 and 8. The ramp ring 56 is rotated until the lower ramps 52 no longer contact the upper ramps 50. The force actuator 40 is then depressurized and the lock ring 30 is rotated until the connector pin heads 60c can pass through. At this point, the lift cylinder assemblies 120 lower the cover positioner assembly C to the cart D.

These removal and replacement operations can be performed manually, however, the greatest utility of the invention can be achieved by using power devices such as pneumatic or hydraulic cylinders as shown in FIG. 1. The quick-acting pipe connector assembly 200 could also utilize pneumatic or hydraulic cylinders to operate the ramp and lock rings. This will allow the entire operation to be conducted in remote which can be desirable when the vessel is at a comparatively high temperature. Although shown as being manually unlocked, the ramp safety lock apparatus 90 could also be remotely operated. The cover positioner assembly C of this invention allows opening and closing of heavy vessel covers without exposing personnel to the dangers of vessel contents which may be at dangerous pressure and temperature or which may be toxic.

The foregoing disclosure and description of the invention are illustrative and explanatory thereof, and various changes in the size, shape, and materials, as well as in the details of the illustrated construction may be made without departing from the spirit of the invention.

I claim:

1. A quick-acting pipe connector assembly for, connecting two pipe ends, comprising:
   a pipe flange connected to a first pipe end, said pipe flange having a plurality of openings around its periphery;
   a pipe end fitting having an end face sized to fit against said pipe flange;
   force ring attached to said pipe end fitting and having a plurality of openings around its periphery;
   a plurality of connector bolts attached to and extending through said openings in said force ring, each of said connector bolts extending through one of said openings in said pipe flange;
   a lock ring rotatably attached to said pipe flange, said pipe flange being located between said lock ring and said force ring, said lock ring rotating relative to said connector bolts to lock said connector bolts to said pipe flange;
   a force actuator disposed in said force ring, said force actuator expanding under fluid pressure to react against said force ring and place said locked connector bolts in a prestressed condition and seal said pipe end fitting against said pipe flange; and
   a ramp ring assembly rotatably supported by said force ring, said ramp ring is rotated to lock said pipe end fitting against said pipe flange.

2. The assembly according to claim 1, wherein each of said connector bolts comprises:
   a connector bolt shaft having a threaded end portion;
   a head at one end of said connector bolt shaft;
   a nut engaging said threaded end portion; and
   a shoulder on said connector bolt shaft near said head to radially position said connector bolt shaft within the respective opening in said force ring.

3. The assembly according to claim 2, further comprising:
   means for withdrawing said plurality of connector bolts to a retracted position in which said connector bolts do not extend beyond said end face of said pipe end fitting.

4. The assembly according to claim 1, wherein said force ring comprises:
   a fixed force ring mounted to said pipe end fitting; and
   a moveable force ring connected to said fixed force ring,
   wherein said moveable force ring is allowed to move a limited distance along the length of the pipe.

5. The assembly according to claim 4, wherein said ramp ring assembly further comprises:
   a plurality of fixed ramps attached to said fixed force ring;
   a moveable ramp ring rotatably contacting said moveable force ring; and
   a plurality of moveable ramps attached to said moveable ramp ring,
   wherein each of said plurality of moveable ramps is positioned so as to match a said fixed ramp on said fixed force ring and by rotation of said ramp ring relative to said fixed force ring to lock said pipe end fitting against said flange.

6. The assembly according to claim 1, wherein said pipe end fitting is connected to a second pipe end and the first and second pipe ends each have a longitudinal axis, said pipe flange includes a flange end face substantially perpendicular to the longitudinal axis of the first pipe end and said fitting end face is substantially perpendicular to the longitudinal axis of the second pipe end.

7. The assembly according to claim 6, wherein said flange end face and said fitting end face are each approximately 2 to 5 degrees from being perpendicular to the longitudinal axis of the respective pipe ends.

8. A quick-acting pipe connector assembly for connecting a first pipe to a second pipe, comprising:
   a flange connected to the first pipe, said flange having a flange end face and a plurality of openings around the periphery of said flange end face;
   an end fitting connected to the second pipe, said end fitting having a fitting end face sized to fit against said flange end face;
   a force ring attached to said end fitting and having a plurality of openings around its periphery;
   a plurality of connector bolts attached to and extending through said openings in said force ring, each of said connector bolts extending through one of said openings in said flange;
   a lock ring rotatably attached to said flange, said flange being positioned between said lock ring and said force ring, said lock ring rotating relative to said connector bolts to lock said connector bolts to said flange;
   a force actuator disposed in said force ring, said force actuator expanding under fluid pressure to react against said force ring and place said locked connector bolts in a prestressed condition and seal said end fitting against said flange; and a ramp ring assembly rotatably supported by said force ring, said ramp ring is rotated to lock said end fitting against said flange.

9. The assembly according to claim 8, wherein the first and second pipes each have a longitudinal axis and said flange end face is substantially ; perpendicular to the longitudinal axis of the first pipe and said fitting end face is substantially perpendicular to the longitudinal axis of the second pipe.

10. The assembly according to claim 9, wherein said flange end face and said fitting end face are each approximately 2 to 5 degrees from being perpendicular to the longitudinal axis of the respective pipes.

11. A quick-acting pipe connector assembly for connecting a first pipe to a second pipe, the first and second pipes each having a longitudinal axis, the quick-acting pipe connector assembly comprising:
a flange connected to the first pipe, said flange having a flange end face and a plurality of openings around the periphery of said flange end face;
an end fitting connected to the second pipe, said end fitting having a fitting end face sized to fit against said flange end face;
a force ring attached to said end fitting and having a plurality of openings around its periphery;
a plurality of connector bolts attached to and extending through said openings in said force ring, each of said connector bolts extending through one of said openings in said flange;
a lock ring rotatably attached to said flange, said flange being positioned between said lock ring and said force ring, said lock ring rotating relative to said connector bolts to lock said connector bolts to said flange; and
force actuating means for placing said locked connector bolts in a prestressed condition and sealing said end fitting against said flange.

12. The assembly according to claim 11, wherein said flange end face is substantially perpendicular to the longitudinal axis of the first pipe and said fitting end face is substantially perpendicular to the longitudinal axis of the second pipe 13. The assembly according to claim 12, wherein said flange end face and said fitting end face are each approximately 2 to 5 degrees from being perpendicular to the longitudinal axis of the respective pipes.

* * * * *